United States Patent
Lowell et al.

(10) Patent No.: US 7,150,617 B1
(45) Date of Patent: Dec. 19, 2006

(54) MULTIPLE POSITION PRESS

(75) Inventors: Mark D. Lowell, Gloucester, VA (US); James A. Gusack, Williamsburg, VA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 468 days.

(21) Appl. No.: 10/714,352

(22) Filed: Nov. 17, 2003

(51) Int. Cl.
*B29C 43/04* (2006.01)
*B29C 43/58* (2006.01)

(52) U.S. Cl. .................. 425/78; 425/150; 425/344; 425/422; 100/269.01

(58) Field of Classification Search .............. 425/78, 425/150, 344, 355, 415, 422; 100/232, 240, 100/244, 269.01
See application file for complete search history.

(56) References Cited

U.S. PATENT DOCUMENTS

| | | | |
|---|---|---|---|
| 1,117,533 A | 11/1914 | Taylor | |
| 3,890,413 A | 6/1975 | Peterson | |
| 4,029,456 A * | 6/1977 | Ahrweiler | 425/149 |
| 4,240,778 A * | 12/1980 | Korytko | 425/150 |
| 4,802,836 A | 2/1989 | Whissell | |

* cited by examiner

*Primary Examiner*—Yogendra N. Gupta
*Assistant Examiner*—Thu Khanh T. Nguyen
(74) *Attorney, Agent, or Firm*—Fredric J. Zimmerman

(57) ABSTRACT

A modular press assembly for performing multiple position pressing with a single press. The modular press assembly includes a floating mount attached to the upper platen of the press, a hydraulic cylinder, and a press ram coupled to the cylinder which automatically guides itself precisely into axial alignment with a die situated on a lower platen and containing material to be pressed. A plurality of such press assemblies are mounted on the upper platen and are connected through respective flow control valves to an independent hydraulic control system to allow adjustment of the travel of the multiple press rams. This configuration facilitates multiple position pressing and equally divides the total press force from the single hydraulic press, distributing it among each of the multiple positions independent of the final height of each pressed body.

10 Claims, 4 Drawing Sheets

MULTIPLE POSITION PRESS

STATEMENT OF GOVERNMENT INTEREST

The invention described herein may be manufactured and used by or for the Government of the United States of America for governmental purposes without payment of any royalties thereon or therefor.

BACKGROUND OF INVENTION a. Field of Invention

The present invention relates to hydraulic presses for compressing materials and, more particularly, to a modular press assembly which can be retrofit to an existing press or supplied as original equipment, in either case allowing multiple batches of material, of differing height, to be compressed with the same force, by the single press, in one operation.

b. Description of the Background

In various industries, it is necessary to prepare a mixture of ingredients in a compact solid body, having uniform size and shape. This is often the case where a measured amount of consumable material must be inserted into a chamber or other container, having a particular shape. Often, the ingredients are assembled in granular, powder and/or liquid form, to facilitate mixing. A binder is added and the mixture is pressed in a mold to form a solid body, of uniform shape comprising a homogeneous mixture of the ingredients. Shaped bodies of compressed material are formed by a pair of opposing rams operating on the mixture of material disposed within a shaped die, which is typically cylindrical but which may produce other shapes. The rams are operated by a press and exert pressure from opposite open ends of the die. Pressed density and consistent dimensions depend not on directly controlling the mechanical displacement of the rams, but mostly on precise control of the pressing force and amount of ingredients; even so, the finished height of the shape will typically have tiny variations.

In processing, for example, explosive molding powders, a relatively high pressure is required to achieve the degree of compression necessary to produce a body of the desired density and size. A set of matched, mechanical tools is required to process pressed explosives from a free-flowing molding powder into a precision, high-density consolidated shape. In its most basic form, this tooling set consists of a thick-walled cylinder (die), and two closely fitting pistons (press ram and eject ram). Typically, the tooling is installed in a double-acting hydraulic press, which has two hydraulic cylinders and guided platens. Both the upper and lower platens are moved by their respective cylinders and guided by a set of columns. The hydraulic press also has a center platen that does not move. Prior to installation of the rams and die, all three platens must be adjusted to be parallel to each other within 0.001 to 002 inches to facilitate the best possible axial alignment between the rams and the die. The press ram is attached to the upper platen, and the eject ram is attached to the lower platen. The die is attached to the center platen and does not move. The molding powder is poured into the die, the press ram is pressed down using a precisely regulated force, consolidating the molding powder, the press ram is retracted, and the eject ram pushes the resulting charge up and out of the die. FIG. 1 illustrates this basic tooling arrangement. Variations in the powder weight loaded into each die are a normal consequence of a production weighing operation. These produce varying charge volumes which manifest themselves in variations in finished pressed height. It is standard practice to place one die in the press and to use the press to produce one body at a time. Placing more than one die, in the press, is known as multiple position pressing. In multiple position pressing, variations in height among the positions will cause immediate asymmetric distribution in the press forces unless there is some mechanism to equally divide the press forces that can also accommodate variations in the finished height of each pressed body. The need to precisely regulate the pressing force, in explosives production, currently requires that each body be pressed separately.

In addition, in the large scale presses necessary to produce the required pressing force, it is impossible to make the axes of the rams travel in perfect alignment with the axis of the die when the rams are rigidly bolted to the platens. Even when the platens are adjusted to near-perfect parallelism, attempts to do this inevitably result in destructive galling as the rams rub on or dig into the walls of the die, proportionate with the degree of misalignment between the platen guide columns and the axis of the die. If galling occurs with a charge of explosive molding powder, it is likely to initiate the explosive, producing a destructive accident. Therefore some degree of mechanical freedom must be devised for the rams to maintain alignment with the die in the horizontal plane as they engage the die in the vertical direction. This problem has already been addressed by prior tooling for single position pressing. FIG. 2 illustrates prior art for an existing press ram floating adaptor, which allows for automatic horizontal adjustment of the position of the ram.

The conventional method has always been to install and actuate a single set of tooling. The presses available to general industry (which have been adapted to explosives processing) are designed for single position tooling sets. They have no capability to exactly divide the pressing forces among multiple position tooling sets. The operation of compressing explosives to the desired size and density is time consuming and it would be an advantage to use multiple position tool sets to compress multiple bodies of explosives in a single operation of the press. There is a need for an improvement to the hydraulic press to accommodate multiple tool sets with control to exactly divide and distribute the press force exerted on each of the tool sets. There is also a need for an improvement to the hydraulic press to provide some degree of automatic axial adjustment of the ram positions, to compensate for minor misalignment of the ram and die's vertical axes and prevent destructive tool damage.

SUMMARY OF THE INVENTION

The innovation, of the present invention, is a modular press assembly for an existing hydraulic press that can either be retrofitted to the existing upper press platens or incorporated into new presses to make multiple position pressing possible. Each multiple press assembly is a combination of a compact hydraulic cylinder, having a hydraulic reservoir and a piston, with an adjustable connector for attaching the press rams to the upper platen. The adjustable connector attaches the press assembly to the platen while allowing it a horizontal degree of freedom that is greater than the expected misalignment of the press ram and die. Thus, the hydraulic reservoir and a communicating piston support the press ram and allow the vertical degree of freedom necessary for load sharing and height differential among tooling sets, by operation of the hydraulic cylinder. The degree of play in the mounting of the piston, within the hydraulic cylinder, provides an automatic compensation for a minor misalignment between the vertical axes of the press ram and the die.

To achieve multiple position pressing, several identical press assemblies are hydraulically connected to each other in parallel, to an independent hydraulic control system, and thereby remain completely isolated from the hydraulics that make the press move. The number of press assemblies that can be used at one time is limited only when the sum of the forces on each tooling set exceeds the total capacity of the main press ram.

During the process of multiple position pressing, the hydraulic pressure of each modular press assembly automatically equalizes to achieve the desired division of total press force into smaller but equal press forces on each pressed body, and to accommodate variations in finished pressed height of each body, independent of the operation of the press. The flow of hydraulic fluid between press assemblies may be adjusted by conventional hydraulic flow controls to allow each press ram to smoothly transition to its final press height. In addition, isolation valves may be used to inactivate individual press assemblies, leaving the remaining ones connected in parallel. In this manner, the overall hydraulic press may be used to press any number of positions simultaneously, from one to as many as the press is fitted for, as long as the active positions provide a balanced load on the press platens and the sum of the forces in all active positions does not exceed the total force capacity of the hydraulic press.

BRIEF DESCRIPTION OF THE DRAWINGS

Other objects, features and advantages of the present invention will become more apparent from the following detailed description of the preferred embodiment and certain modifications thereof when taken together with the accompanying drawings in which.

DETAILED DESCRIPTION OF THE PREFERRED EMBODIMENTS

The modular press assembly according to the present invention is an improvement to a hydraulic press which, when incorporated in number, facilitates multiple position pressing. Each modular press assembly automatically aligns the axes of the press rams and the axes of the dies, and when two or more modular press assemblies are employed they automatically balance the pressing force at their respective press positions, without regard to variations in height of the pressed material. The modular press assemblies may be retrofit to an existing hydraulic press or can be incorporated into the original design of the hydraulic press.

Figure 1:
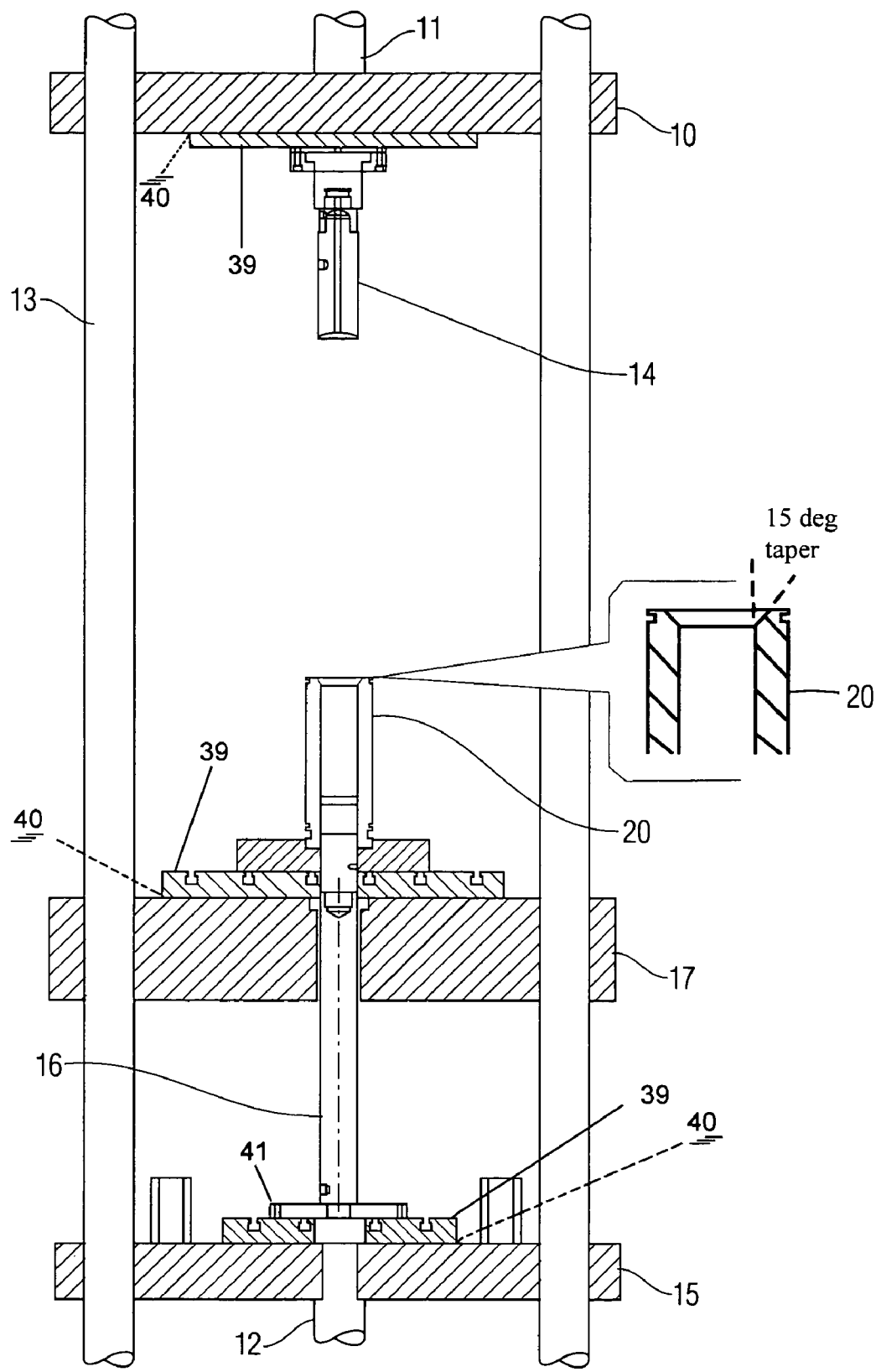
FIG. 1 is a sectional view of a prior art 200 ton hydraulic press of the type intended to be used with the present invention.

A conventional hydraulic press is shown in FIG. 1 and has a movable upper platen 10, driven downward by a first hydraulic cylinder 11. The hydraulic press has a movable lower platen 15, driven by a second hydraulic cylinder 12. Four vertical columns 13 rest on a firm support surface and guide the movement of the upper platen 10 and the lower platen 15 along a vertical path of travel. By way of example, a 200 ton press is one of many possible sizes typically used in explosives processing. A press ram 14 is mounted on the underside of the upper platen 10 and extends downward. An eject ram 16 is mounted on a slider plate 41 and extends upward. The slider plate 41 has an oversized set of bolt holes. A set of bolts and washers loosely confine the eject ram 16 and slider plate 41 to the lower platen 15, allowing free lateral movement of the eject ram to maintain constant alignment with the die 20. The eject ram 16 is driven upward by the second hydraulic cylinder 12. A fixed center platen 17 is disposed between the upper platen 10 and the lower platen 15, and holds the die 20 in a non-adjustable position. The center platen 17 is provided with a central aperture through which the eject ram 16 passes. All three platens are effectively adjusted to be parallel to each other within 0.001 to 0.002 inches by means of intermediate plates 39 and shims 40 that are inserted between the intermediate plates 39 and their respective platens. FIG. 1 shows exemplary sets of shims 40, depicted in removed positions, with dotted lines indicating typical points of insertion around the periphery of the intermediate plates 39.

Figure 2:
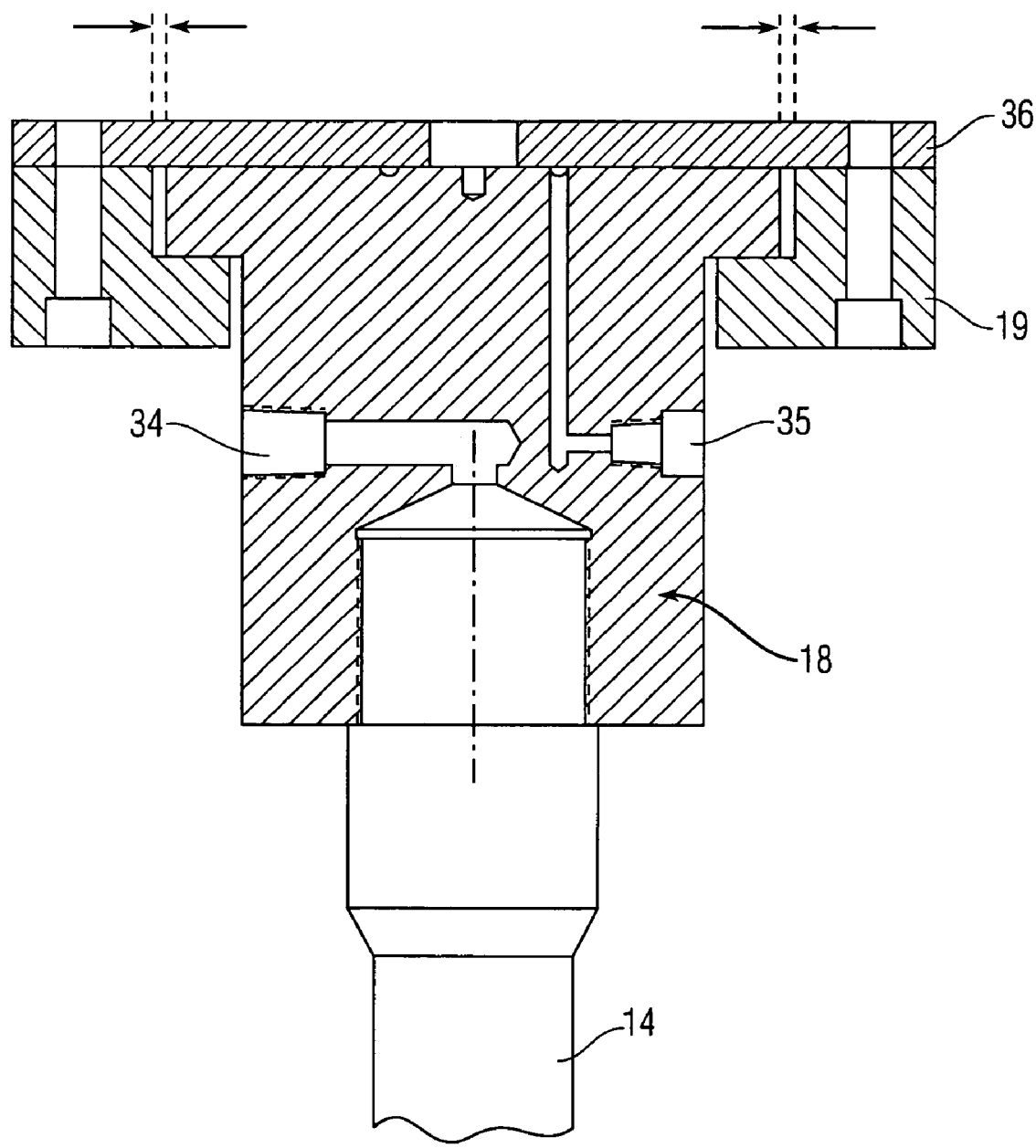
FIG. 2 is a cross section of a prior art floating collar and clamp ring for attaching a press ram to a platen.

The press ram 14 is mounted as shown in FIG. 2. Said press ram 14 is attached to a collar 18, which at its upper end has a circular flange extending outward, perpendicular to the axis of the press ram 14. A circular clamp ring 19 and a bearing plate 36 are attached to the upper platen 10 (seen in FIG. 1) by suitable means such as bolts. The clamp ring 19 has an inner flange sized to loosely confine the flange of the collar 18 vertically between the flange of the clamp ring 19 and the surface of the bearing plate 36. The circumference of the inner surface of the clamp ring 19 is sized so as to allow a narrow gap (shown by dotted lines, in FIG. 2) between the clamp ring 19 and the collar 18, so that the collar 18 may be freely shifted slightly in any direction perpendicular to the axis of the die 20. Referring back to FIG. 1, the die 20 has a tapered upper entrance so that the position of the press ram 14, on the upper platen 10, does not need to be adjusted for exact alignment with the die 20 before being bolted in place. It will be appreciated that various means may be used to provide horizontal freedom of movement in the means for mounting the collar 18 to the upper platen 10, to allow for free-floating, automatic adjustment in obtaining exact alignment as the press ram 14 enters and is captured by the entrance taper of the die 20. An internal port 34 (shown in FIG. 2) is used to apply vacuum to a matching port (not shown) in the press ram 14, as an aid to molding powder consolidation. A second internal port 35, is used to force lubricant between the collar 18 and the bearing plate 36 to promote free-floating action.

In operation, a die 20 (shown in FIG. 1) is mounted on the center platen 17. The die 20 typically has a cylindrical shape and is positioned over the eject ram 16 which is withdrawn near the bottom of the die 20. Material to be compressed is loaded into the die 20. The upper platen 10 is advanced forcibly, by the first hydraulic cylinder 11. The press ram 14 engages the taper in the entrance of the die 20, which is always larger than the horizontal freedom of the press ram (to ensure capture), and is automatically guided into proper axial alignment as they mate and as the collar 18 shifts horizontally inside the clamp ring 19. The first hydraulic cylinder 11 is operably controlled to apply the desired amount of pressure to the material. The press ram 14 is withdrawn and the second hydraulic cylinder 12 is activated to push the eject ram 16 up, forcing the pressed body out of the die 20. The second hydraulic cylinder 12 and eject ram 16 are withdrawn, new material is placed in the die 20 and the operation is repeated to produce one compressed body of material per run of the press.

Figure 3A:
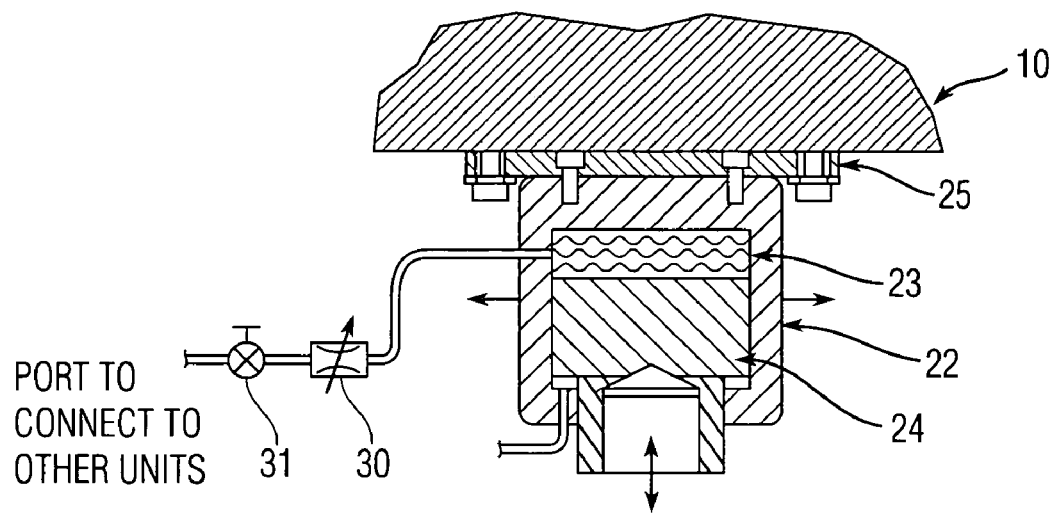
FIGS. 3a and 3b are vertical cross sections of the modular press assembly of the present invention showing the piston extended fully, in FIG. 3a and withdrawn fully, in FIG. 3b.
Figure 3B:
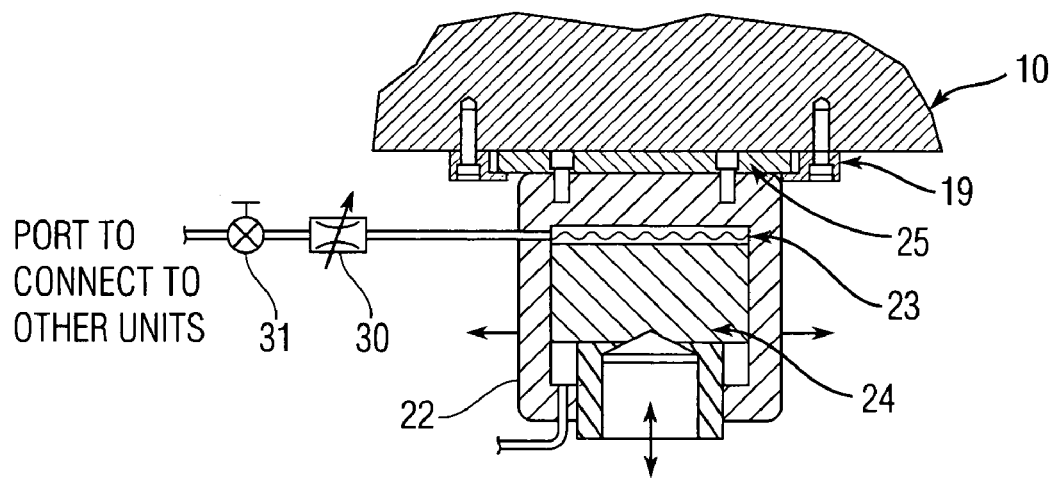
Figure 4:
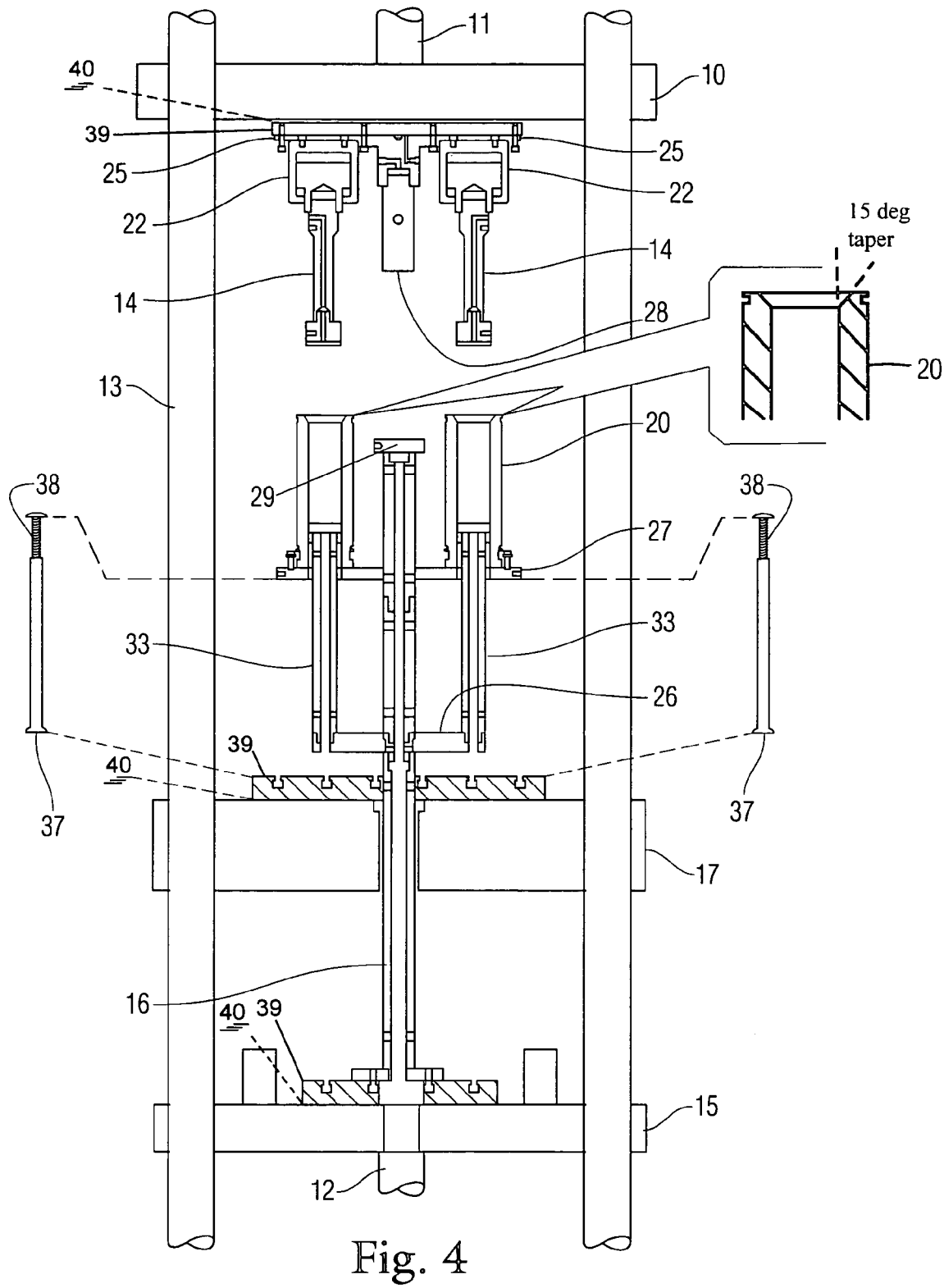
FIG. 4 is a sectional view of a hydraulic press as in FIG. 1 retrofitted with two modular press assemblies, mounted opposite two corresponding dies.

The improvement of the present invention is a modular press assembly comprising a slider plate 25, having a first set of bolt holes as shown in FIGS. 3a and 3b, which is bolted to a hydraulic cylinder 22. The hydraulic cylinder 22 has a hydraulic reservoir 23 in communication with a piston 24, on which a press ram 14 (as in FIG. 2) is mounted. While materials and dimensions may vary, it is generally preferred that the modular press assembly be properly designed to handle the actual forces placed on it and have a stroke greater than the maximum anticipated difference in pressed height among multiple pressed bodies. The hydraulic reservoir 23 is connected to an independent hydraulic control system, preferably through a conventional flow control valve 30 and a conventional isolation valve 31 to a common manifold (not shown). The independent hydraulic control system is separate from the system(s) which control the upper platen 10 and the lower platen 15. As seen in FIG. 3b, the slider plate 25 can be mounted to the upper platen 10 in the same manner that the collar 18 (of FIG. 2) is mounted to the upper platen 10, e.g., using an oversize clamp ring 19 that allows for horizontal adjustment (parallel to the planar surface of the platen) as needed to align the press ram 14 with the die 20. An alternate mounting is illustrated in FIGS. 3a and 4, where the slider plate 25 is simply provided with a second set of bolt holes. A second set of bolts and washers 32 loosely confine the slider plate 25 vertically to the surface of the upper platen 10. In this case, the second set of bolt holes in the slider plate 25 is preferably oversized to allow for some degree of movement, parallel to the planar surface of the upper platen 10, which gives the entire modular press assembly a horizontal degree of freedom, including the orientation of the press ram 14, which automatically accounts for any minor misalignment between the axes of the press ram 14 and the die 20 as they mate. This alternate mounting is the same scheme previously described to allow the eject ram 16 to float laterally as seen in FIG. 1.

In accordance with the present invention it is possible to install a plurality of modular press assemblies, on the upper platen 10 and a corresponding number of eject rams 16, in alignment with the modular press assemblies. Specifically, to achieve multiple position pressing, several identical press assemblies as seen in FIGS. 3a & 3b are hydraulically connected to the same independent control system, in parallel, and thereby remain completely isolated from the hydraulics that make the press move. The common hydraulic system manifold leads to the flow control valve 30 and isolation valve 31 of each press assembly allowing isolation and individual control. Thus, with multiple press assemblies connected, the hydraulic cylinders 22 may extend or withdraw the press rams 14 toward or away from the center platen 17, independent of the position of the upper platen 10 as the press rams 14 consolidate the pressed bodies to slightly different heights and as hydraulic fluid redistributes itself hydrostatically throughout the common manifold. The horizontal degree of freedom of the modular press assemblies greatly reduces the tendency of the ram 14 to damage the die 20 by galling and reduces the chance of a destructive explosive accident when energetic molding powder is used.

The conventional press (of FIGS. 1 & 2) is provided with a single eject ram 16 passing through a single aperture in the center platen 17, and this singular eject configuration is modified for multiple ejection of the multiple press assemblies described above. This is readily accomplished as shown in FIG. 4 with a bridge plate 26 mounted on the eject ram 16 for receiving a plurality of eject rams 33 corresponding to the plurality of modular press assemblies. A die platen 27 is provided which is spaced apart from and attached to the center platen 17 by a plurality of struts comprising tubular legs 37 and long bolts 38 inserted therein. In practice, the long bolts 38 may consist of a length of threaded rod, a nut, and a washer. A plurality of tubular legs 37 and long bolts 38 (ten sets are suitable) are equally spaced around the perimeter of the die platen 27 and are attached to the underside thereof. The tubular legs 37 and long bolts 38 extend downward and attach to the center platen 17. FIG. 4 shows two exemplary tubular legs 37 and long bolts 38, depicted in a position removed from the press, with dotted lines indicating the points of attachment. The die platen 27 is provided with a plurality of axially-spaced apertures corresponding to the respective eject rams 33 to allow passage there through. The eject rams 33 may be physically similar to the existing eject ram 16, albeit smaller in size. This configuration allows a plurality of dies 20 to be positioned on the die platen 27, which is held firmly in place by the center platen 17, while all the eject rams 16, 33 move in tandem with the movement of the lower platen 15 as shown in FIG. 4. Individual dies 20 may be mounted over each eject ram 33 and multiple bodies of material may be pressed during one operation. The desired press force may be obtained on each body by first adjusting the upper hydraulic cylinder of the hydraulic press 11 to generate the sum total of the press forces for all active modular press assemblies to be used at once. It is intended that the hydraulic systems of the modular press assemblies would be connected in parallel with simple tubing manifold for economy of system components while retaining the capability of hydraulic fluid to distribute to each of the press assemblies. As long as each piston 24 has the same area, the total press force of the upper hydraulic cylinder of the press 11 will be evenly divided among all the modular press assemblies, delivering the desired press force to each pressed body while at the same time allowing each pressed body to have a unique height within the limits of the stroke of the pistons 24. Although the modular press assemblies are intended to be installed on conventional presses, it will be appreciated that the press assemblies could be incorporated into the design of many types of presses, without departing from the inventive concept disclosed and claimed herein.

As a further safety measure, a post 28 and a stop 29 may be mounted on the upper platen 10 and on the eject ram 16, respectively, to limit the advance of both the upper platen 10 and lower platen 15 (as shown in FIG. 4). This safety measure may be used to prevent the press rams 14 from contacting the eject rams 33, thereby preventing potential damage to the rams and a destructive explosive accident when energetic molding powder is used.

During the process of multiple position pressing, the hydraulic pressure of each modular press assembly automatically equalizes to achieve the desired division of total press force into smaller but equal press forces on each pressed body, and to accommodate variations in finished pressed height of each body, independent of the operation of the press. The flow of hydraulic fluid between the press assemblies may be adjusted by the flow control valves 30 to allow each press ram to smoothly transition to its final press height. In addition, isolation valves 31 may be used to inactivate individual press assemblies, leaving the remaining ones connected in parallel. In this manner, the overall hydraulic press may be used to press any number of positions simultaneously, from one to as many as the press is fitted for, as long as the active positions provide a balanced load on the press platens and as long as the sum total of the forces of the active positions does not exceed the force capacity of the hydraulic press. Whether retrofit to an existing press or supplied as original equipment with the press, the multiple press assemblies of the present invention allow multiple batches of material, of differing height, to be compressed with the same force, by the single press, in one efficient operation.

Having now fully set forth the preferred embodiments and certain modifications of the concept underlying the present invention, it is to be understood, therefore, that the invention may be practiced otherwise than as specifically set forth in the appended claims.

We claim:

1. In a hydraulic press having a first platen and a second platen wherein said first platen is movable against said second platen, having multiple dies, for containing bodies to be pressed, mounted on a center platen of said press and having a first hydraulic control system for moving said first platen against said second platen, a multiple position tool set comprising a plurality of modular press assemblies and an eject ram assembly, for ejecting said bodies, each of said modular press assemblies comprising:
   a floating mount for attaching the press assembly to said first platen while allowing a lateral degree of freedom of said press assembly;
   a hydraulic cylinder connected to an isolated hydraulic control system through a flow control valve, said hydraulic cylinder including a hydraulic reservoir and a piston;
   a press ram operably connected to said piston and advanced by a combination of said first hydraulic system, and said isolated hydraulic system moderated by said flow control valve.

2. The multiple position tool set of claim 1 wherein the floating mount further comprises:
   a collar for receiving said hydraulic cylinder and having an outwardly extending flange, and a clamp ring fixedly attached to said first platen over said collar flange for slidably confining the collar against the first platen.

3. The multiple position tool set of claim 1, wherein said floating mount comprises a mounting plate having oversized bolt holes, and bolts for slidably securing the mounting plate against the first platen.

4. In a hydraulic press having a first platen, a second platen, means for forcibly advancing said first platen against said second platen and multiple dies, for containing bodies to be pressed, mounted between said first platen and said second platen, an improvement comprising:
   a plurality of modular press assemblies mechanically connected to said forcible advancing means, each having a press ram operably connected to isolated hydraulic means for varying the advance of said press ram;
   adjustable means for controlling said isolated hydraulic means to divide and distribute the pressing force of said first platen among said press assemblies;
   adjustable mounting means for connecting said modular press assemblies to said forcible advancing means in approximate coaxial alignment with said dies, such that each of said press rams may be advanced by said hydraulic means or by said means for advancing said first platen, while automatically producing and maintaining exact said coaxial alignment as said press rams and said dies mate; and
   means for ejecting said bodies from said dies.

5. The multiple position tool set of claim 1 wherein said floating mount comprises an outwardly extending flange on said modular press assembly and a clamp ring having an inner flange and being adapted to surround the modular press assembly and confine the flange of the modular press assembly against the flange of the clamp ring.

6. The multiple position tool set of claim 5 wherein said clamp ring is sized to allow movement of the modular press assembly in any direction parallel to the abutting surfaces of said flanges and being provided with bolt holes for securing the clamp ring to said first platen, such that the modular press assembly may be moved to a selected location, in alignment with said corresponding die and bolted securely in position.

7. The multiple position tool set of claim 1 wherein said floating mount comprises a mounting plate having a first set of bolt holes for securing said modular press assembly to said mounting plate and a second set of bolt holes for securing said mounting plate to said first platen, and said second set of bolt holes are oversized, such that the modular press assembly may slide to a selected location, in alignment with said corresponding die while bolted securely to said first platen.

8. The improvement in a hydraulic press of claim 4, wherein said means for ejecting pressed bodies from said dies comprises:
   means for forcibly advancing said second platen relative to said dies; and
   multiple eject rams mechanically connected to said second platen in corresponding coaxial alignment with said dies.

9. The multiple position tool set of claim 1, wherein said eject ram assembly comprises:
   a second hydraulic control system for moving said second platen relative to said dies; and
   a plurality of eject rams, corresponding to said press assemblies, mechanically connected to said second platen for ejecting pressed bodies from said dies, said eject rams being positioned in coaxial alignment with said dies.

10. The multiple position tool set of claim 9 wherein said second platen is provided with a single eject ram, mounted thereon and said plurality of eject rams is connected to said second platen by a bridge assembly comprising:
   a bridge plate mounted on said single eject ram and having said plurality of eject rams mounted on said bridge plate;
   a die platen spaced apart from said center platen and connected by struts; said dies being mounted on said die platen;
   said die platen having a plurality of apertures for passing said eject rams there through.

* * * * *